UNITED STATES PATENT OFFICE.

JOHN H. LESTER, OF BROOKLYN, NEW YORK.

IMPROVED OIL FOR LUBRICATING MACHINERY, &c.

Specification forming part of Letters Patent No. 52,301, dated January 30, 1866.

*To all whom it may concern:*

Be it known that I, JOHN H. LESTER, of Brooklyn, Kings county, and State of New York, have invented a certain new and useful Improvement in the Manufacture or Production of an Improved Mechanical Oil for Lubricating Machinery and other Purposes; and I do hereby declare the nature of the same to be fully described in the following specification, viz:

The nature of my invention consists in producing from a combination of common oils with fatty and glutinous ingredients a superior lubricating oil by a very simple process, which I shall explain as follows.

Of the ingredients which are simple and abundant I use about the following proportions: one part of gelatine or the glutinous substance extracted from cattle's feet or hides; two parts of the fat, tallow, and glutinous matter of the bullock and other animals; one part of pressed paraffine or mineral oil, and one-eighth part of animal, vegetable, or fish oil.

The manufacturing process I accomplish by placing the cattle's feet, the hides, tallow, or carcass of a bullock or other animals in a boiler, and I now put in the boiler a quantity of soft water sufficient to cover the former. I then boil the whole at a temperature of about 240° Fahrenheit for about four hours, or until the flesh and gristle is removed from the bone. The bone I now remove from the boiler or reduce the same so as to form a component part of my oil, if desired. I next put into the boiler the paraffine oil for the purpose of neutralizing and holding permanently in solution the previously deposited ingredients or fatty and glutinous matters; or the paraffine may be introduced for the same purpose when cooled off in the vats. I now draw off the liquid so formed from the boiler into vats or tanks and allow the same to cool down to about 70°. I then introduce the fish, animal, or vegetable oil and agitate the mixture. Finally I run the same off from the vats into barrels, when my improved mechanical oil is ready for the market.

The advantages gained by my oil over those used for similar purposes are that the ingredients of which my oil is composed are abundant, the process of manufacturing the same exceedingly convenient and simple, and besides this it is found that my oil, as compared with the very best oil now used for lubricating machinery, is not only superior in quality, but that the consumption of my oil is only seventy-five per cent. of the present consumption of mechanical oils, as proven from several protracted experiments made by a prominent manufacturing establishment in the city of New York, from whom I hold a certificate to this effect. Furthermore, my mechanical oil can be manufactured and sold for fifty per cent. of the price of the best sperm or other oil in the market.

I am aware that oils are made from mixing oil and fatty matter, &c., but such is not new. I therefore do not claim such; but What I do claim, and desire to secure by Letters Patent, is—

The above-described production of an improved mechanical oil for lubricating machinery and other purposes, substantially as set forth.

In testimony whereof I have hereunto set my signature.

JOHN H. LESTER.

In presence of—
   GEO. H. HARRISON,
   A. NEILL.